April 22, 1930.  T. E. MORRIS  1,755,964
AUTOMATIC TEMPERATURE RELIEF VALVE

Filed Dec. 20, 1927

INVENTOR,
Thomas E. Morris,
BY
Harry W. Bowen.
ATTORNEY.

Patented Apr. 22, 1930

1,755,964

UNITED STATES PATENT OFFICE

THOMAS E. MORRIS, OF LONGMEADOW, MASSACHUSETTS

AUTOMATIC TEMPERATURE-RELIEF VALVE

Application filed December 20, 1927. Serial No. 241,414.

This invention relates to improvements in automatic temperature relief valves. An object of the invention is to provide a valve which will maintain the temperature of a kitchen hot water tank, or the like, practically uniform or constant in order to prevent over heating of the water and a possible explosion of the same by reason of the generation of steam. It is a common practice at the present time to provide a spring or weight actuated valve for relieving the excessive pressure of the tank. These are more or less unreliable by reason of the use of springs, or weights.

The present invention broadly comprises a structure which is designed to automatically retain a discharge valve normally closed by reason of the difference of pressure on the valve and on a diaphragm to which the valve is connected. A stop device is provided which limits the movement of the diaphragm in the direction of closing the valve whereby when the temperature increases a thermostat which is connected to the valve, will operate to automatically open the discharge valve and allow some of the hot water at the upper end of the tank to escape. A corresponding quantity of cold water now enters the tank thus lowering the temperature again and causing the thermostat to operate again to close the valve.

Referring to the drawings.

Figure 1:
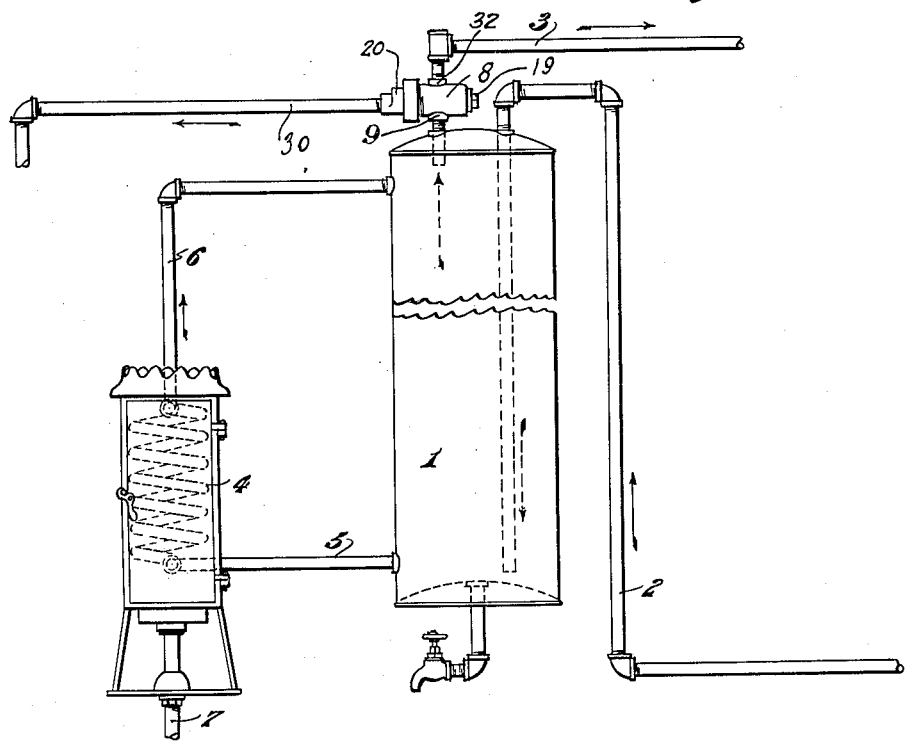
Fig. 1 is a diagrammatic view of a kitchen hot water tank having cold and hot water pipe connections and a water heater for the tank.
Figure 2:
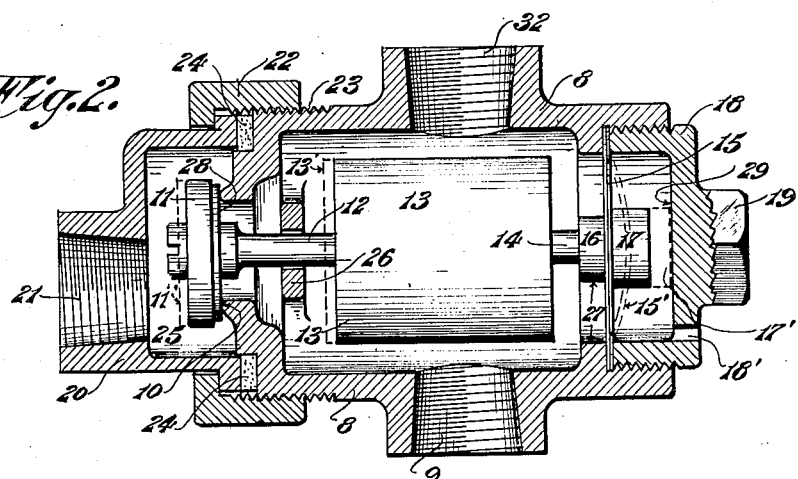
Fig. 2 is a detail sectional view of the relief valve considered on a plane through the axis of the relief valve showing the diaphragm and the discharge valve also the thermostat connecting the diaphragm and the valve.

Referring to the drawings in detail:

1 designates the usual hot water kitchen tank or the like, 2 the cold water inlet pipe connection, 3 the hot water supply pipe, 4 a suitable water heat having the cold water inlet pipe 5 and the discharge pipe 6 and the connection to the gas main 7. 8 designates the main casing of the relief valve which is formed with the threaded pipe connecting part 9. The casing part 8 is formed with a valve seat 10 against which the discharge valve 11 normally seats. This valve is connected to the stem 12 which, in turn, is connected to the thermostat member 13. The opposite end of the thermostat is connected to the rod 14 and this rod is connected to the laminated diaphragm 15 by means of the clamping members 16 and 17. The diaphragm 15 is secured to the casing member 8 by means of the threaded plug 18 which firmly clamps the diaphragm 15 at its outer edges to the part 8. The number 17 serves as a stop when it engages the threaded plug 18. 19 is an integral square headed part for applying a wrench, or other tool, for threading the threaded plug 18 into the part 8. Secured to the opposite end of the casing member 8 is an extension part 20 having the threaded pipe connection opening 21. This extension is secured to the casing 8 by means of the flanged coupling 22, the internal threads of which engage the threads 23. 24 is a suitable packing for making the extension water tight.

It will be noticed that space 25 in which the valve 11 operates, permits any water that may collect in this space to run off through the discharge pipe connection opening 21, thus preventing the possible freezing of the valve 11 should water be allowed to accumulate in this space. The valve stem 12 has a bearing in the integral spider or bar 26.

The operation of the valve is as follows: Normally the valve 11 is retained on the seat 10 by reason of the pressure in the tank 1 operating on the diaphragm 15. The exposed annular pressure area of the diaphragm 15 to the pressure in the tank 1 indicated by the numeral 27, is greater than the exposed annular area of the surface 28 of the valve 11. Should the pressure in the tank 1 increase due to the rise in temperature, the diaphragm 15 will bend or buckle until the part 17 engages the surface 29 of the threaded plug 18, as indicated by the dotted line position 17'. The bent position of the diaphragm is indicated at 15'. The surface 29 operates to limit the movements of the diaphragm and with which surface the member 17 engages when in this bent position. When this occurs the increase in temperature, causes the thermostat 13 to operate. The expansive movement of the thermostat will move the valve 11 away from its seat 10, as shown by the dotted lines 13' and 11', whereby should the temperature of the water be above 180°, for example, the water will escape through the discharge pipe 30 that is connected to the threaded opening 21. After the discharge of water of high temperature in the top of the tank 1 the cold water will enter through the pipe 2 thus lowering the temperature again and cause the valve 11 to automatically close.

An air vent 18' is provided in plug 18. Preferably the relief valve should be located as near the upper part of the tank 1 as possible in order to cause the hot water to flow through both openings 9 and 32 and in contact with the thermostat 13. If the valve is located above the pipe 3 then the heat would be transmitted to the valve by conduction.

From this description it will be seen that I have provided an automatic temperature relief valve for kitchen or other hot water storage tanks which will maintain the temperature of the water constant and prevent excessive rise of temperature and pressure, thus preventing all danger of an explosion due to high temperature and pressure.

What I claim is:

1. A valve for the purpose described comprising a one piece casing member, a thermostat located therein, a stop device connected to the thermostat, a valve connected to the thermostat, diaphragm means connected to the thermostat normally maintaining the valve in closed position, said stop part being located to cooperate with the casing for permitting the valve to open when a predetermined temperature in the casing is reached, said part serving to permit the thermostat to operate the valve only, when the diaphragm assumes a definite position.

2. A temperature relief valve for hot water tanks comprising in combination a casing member formed with an inlet opening and a discharge opening, a valve seat, a valve, means for normally retaining the valve on the valve seat comprising a diaphragm, connected to the valve, the area of said diaphragm exposed to the pressure in the said tank being greater than the exposed area of the valve, a part on the diaphragm which engages the casing when the diaphragm is subjected to an increase of pressure and temperature, whereby upon a further increase in temperature will cause the thermostat to automatically unseat the valve from the discharge opening and permit the overflow of water from the tank.

3. An automatic relief valve for hot water tanks comprising in combination, a casing member connected to the tank, a thermostat in the casing, a valve directly connected to the thermostat at one end and a diaphragm directly connected to the thermostat at its opposite end, the diaphragm being located in the same compartment as the thermostat, the construction permitting the diaphragm to bend or buckle due to the increase of temperature and pressure in the said tank and causing the thermostat to open the valve when the temperature increases to a predetermined point, as described.

4. An automatic temperature relief valve for hot water tanks comprising a casing member having an inlet and discharge opening, a threaded part for connecting the inlet of the casing member to the said tank, a valve for closing the discharge opening, movable means connected to the valve and operated by the pressure in the said tank for normally maintaining the valve closed, thermostat means connected to the valve for unseating the said valve, when a predetermined temperature and pressure in the tank is reached, a stop device connected to the thermostat which cooperates with the casing for causing the valve to open only when the thermostat is subjected to the predetermined temperature and pressure.

5. An automatic temperature relief valve for hot water tanks comprising a casing member having an inlet and a discharge opening, a threaded part for connecting the inlet of the casing to the said tank, a valve for closing the discharge opening, movable means connected to the valve and operated by the pressure in the said tank for normally maintaining the valve closed, and means for unseating the valve when a predetermined temperature and pressure in the tank is reached, said means comprising a stop for limiting the extent of movement of the movable means and a thermostat connected to the valve which operates to open the valve when the temperature and pressure reaches a predetermined point.

6. A temperature relief valve for hot water tanks comprising a casing member having an inlet and a discharge opening, a valve for closing the discharge opening, a diaphragm and thermostat connected to the valve, means for limiting the movement of the diaphragm by the pressure in the tank, said limiting means permitting the thermostat to operate at a predetermined temperature and open the said valve, as described.

7. A temperature relief valve for hot water storage tanks for limiting the rise of temperature of the water in the tank to a predetermined degree comprising a casing member having an inlet, an outlet and a discharge or overflow opening, the inlet opening being for connection with the interior of the tank, the outlet opening being for conducting away the hot water from the tank, a valve for closing the discharge opening, a movable part connected to the valve and subjected to the pressure in the tank for normally maintaining the valve closed, a stop for the movable part, a thermostat connected to the valve which operates to open the valve of the discharge opening when a predetermined temperature in the tank is reached and the movable part is against the stop, whereby the temperature of the tank may be lowered, as described.

THOMAS E. MORRIS.